J. B. DRAKE.
Horse Rake.
No. 41,740. Patented Feb. 23, 1864.
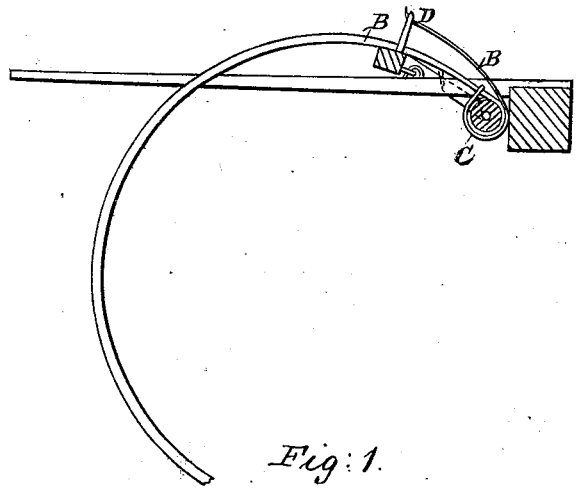
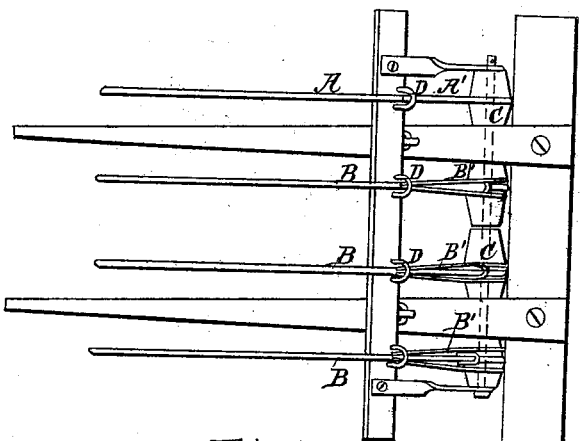
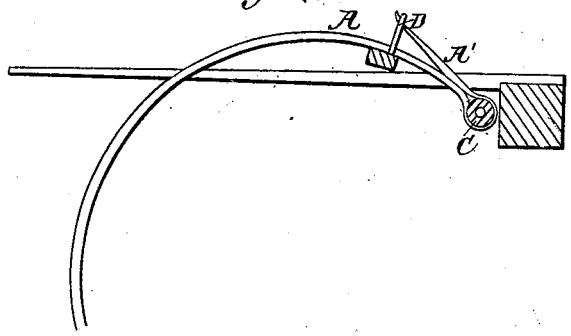
Witnesses.
Inventor.

UNITED STATES PATENT OFFICE.

JAMES B. DRAKE, OF PICTURE ROCKS, PA., ASSIGNOR TO A. B. SPROUT, E. T. SPROUT, S. E. SPROUT, AND L. B. SPROUT, OF SAME PLACE.

IMPROVEMENT IN HORSE-RAKES.

Specification forming part of Letters Patent No. 41,740, dated February 23, 1864.

*To all whom it may concern:*

Be it known that I, JAMES B. DRAKE, of Picture Rocks, Lycoming county, and State of Pennsylvania, have invented a new and useful Spring for Horse-Rake Teeth; and I do hereby declare the following is a full and exact de-description.

The nature of my invention consists in a spring attached to each tooth and spool, as hereinafter described, which gives more elasticity to the tooth, and prevents the tooth from flying back while loading with hay unless the tooth comes in contact with a heavier and harder substance than hay.

To enable others skilled in the art to make and use my invention, I will proceed to describe its construction and operation.

I construct my rakes in any of the known forms, with steel teeth and the other appendages with such rakes; but in order to give the tooth more elasticity, and prevent the tooth from flying back unless it comes in contact with some heavy substance, I make one spring to each tooth, either by drawing a part of the same steel the tooth is made of, as seen at A, Figure 3, or by taking steel or elastic wire of sufficient length to reach around the tooth B, Figs. 1 and 2, and spool C to staple D, which it passes through far enough to prevent it from flying out of the staple D when in operation, as seen in the accompanying drawings.

What I claim as my invention, and desire to secure by Letters Patent, is—

The application of the spring A to the tooth B, spool C, and staple D, as herein described.

J. B. DRAKE.

Witnesses:
OCTAVIUS KNIGHT,
CHARLES D. SMITH.